United States Patent
Saar et al.

(10) Patent No.: US 12,518,561 B2
(45) Date of Patent: Jan. 6, 2026

(54) CONFIDENCE SCORE DETERMINATION FOR FACIAL IMAGE BASED FAMILY RECOGNITION

(71) Applicant: KINSAME TECHNOLOGIES LTD., Magshimim (IL)

(72) Inventors: Tomer Saar, Hod Hasharon (IL); Aviram Bar-Haim, Hod Hasharon (IL); Yoni Donner, Rohnert Park, CA (US)

(73) Assignee: KINSAME TECHNOLOGIES LTD., Magshimim (IL)

( * ) Notice: Subject to any disclaimer, the term of this patent is extended or adjusted under 35 U.S.C. 154(b) by 323 days.

(21) Appl. No.: 18/315,716

(22) Filed: May 11, 2023

(65) Prior Publication Data

US 2024/0378919 A1    Nov. 14, 2024

(51) Int. Cl.
*G06V 40/16* (2022.01)
*G06V 10/74* (2022.01)
*G06V 10/75* (2022.01)

(52) U.S. Cl.
CPC .......... *G06V 40/171* (2022.01); *G06V 10/758* (2022.01); *G06V 10/761* (2022.01)

(58) Field of Classification Search
CPC ... G06V 40/171; G06V 10/761; G06V 10/758
See application file for complete search history.

(56) References Cited

U.S. PATENT DOCUMENTS

| | | | |
|---|---|---|---|
| 8,331,632 B1 * | 12/2012 | Mohanty | G06F 18/2137 382/160 |
| 9,235,782 B1 * | 1/2016 | Zomet | G06V 40/171 |
| 2009/0185723 A1 * | 7/2009 | Kurtz | G06V 40/50 382/118 |

OTHER PUBLICATIONS

Kinship Classification By Modeling Facial Features Heredity by Fang et al. pp. 2983-2987 IEEE 2013 (Year: 2013).*
Deep Multi-Patch Aggregation Network for Kinship Recognition. By Khan et al. pp. 37-42 (Year: 2021).*
Verification of Family Relation From Parents and Child Facial Images. By Dandekar et al. IEEE pp. 157-162 (Year: 2014).*

* cited by examiner

*Primary Examiner* — Christopher S Kelley
(74) *Attorney, Agent, or Firm* — Pillsbury Winthrop Shaw Pittman, LLP

(57) ABSTRACT

The present disclosure relates generally to determining confidence scores for facial image based family relation (e.g., kinship) determinations. A confidence score of a previously unseen facial image (of an unknown individual) search result is determined without knowing the search result's ground truth, based on previously conducted tests of a dataset with a known ground truth, and using prediction results to infer the confidence of the previously unseen example.

20 Claims, 7 Drawing Sheets

CONFIDENCE SCORE DETERMINATION FOR FACIAL IMAGE BASED FAMILY RECOGNITION

BACKGROUND

1. Field

The present disclosure relates generally to determining confidence scores for facial image based family relation (e.g., kinship) determinations.

2. Description of the Related Art

Face recognition solutions have proven to be extremely useful to security, genealogy, and other organizations in identifying individual subjects. However, if an individual subject is not in an organization's image gallery of families, the organization may have a difficult time identifying the individual subject.

SUMMARY

The following is a non-exhaustive listing of some aspects of the present techniques. These and other aspects are described in the following disclosure.

Understanding which subjects have family relationships (or ruling out ones who claim to have, but do not) is valuable for identification and/or other purposes. Advantageously, the present techniques comprise searching an image of an unrecognized subject in an image gallery of families, recognizing a subject's family even if the subject is not imaged in the image gallery themselves by exploiting a genetic similarity of facial features between family members, and determining a confidence that a family recognition is correct. This may facilitate identification of subjects not currently identifiable, and/or have other applications.

For example, an image of an unknown subject may be uploaded to the present system. The system is configured to determine that the subject belongs to a family, and identify the subject's family members whose images and/or other information are part of an existing image gallery of families and/or other application. The subject is identified through his family relationships because genetic facial features appear similar in images of family members.

This type of identification may also facilitate identification of a subject or his family members in real-time emergency situations, identification of a subject for an investigation, finding a person of interest, etc.

Some aspects include a method for estimating the likelihood that a family recognition is correct. The method comprises selecting images of individuals from an image gallery of families, extracting facial features for the individuals from the images, and determining distances from the individuals to the families based on the extracted facial features and aggregated facial features for family members of the families in the image gallery of families. The method comprises determining probability distributions for the individuals such that distances from the individuals to the families are associated with probabilities. A family that most resembles an individual has the highest probability for that individual. The method comprises determining a sorted arrangement of highest probability of related families for the individuals. The method comprises, responsive to receiving an image of an unrecognized subject, determining distances from the subject to the families based on extracted facial features from the image of the subject and the aggregated facial features. A probability distribution is determined for the subject such that the distances from the subject to the families are associated with a probability. A family that most resembles the subject has the highest probability for the subject. The method comprises comparing the highest probability for the subject to the sorted arrangement of highest probabilities of related families to determine a corresponding family associated with the highest probability for the subject. A comparison comprises placing the highest probability for the subject on the sorted arrangement to determine the corresponding family associated with the highest probability for the subject and a corresponding confidence. The method comprises outputting the corresponding family associated with the highest probability for the unrecognized subject and the corresponding confidence for display.

In some embodiments, the method comprises extracting and aggregating the facial features for the family members of the families in the image gallery of families.

In some embodiments, the image gallery of families comprises an image of a face of at least one person in each family and at least one face photo for each person.

In some embodiments, the images of the individuals from the image gallery of families are randomly selected.

In some embodiments, the images of at least 10, 100, 1000, or 10000 of the individuals from the image gallery of families are selected.

In some embodiments, the images of the individuals from the image gallery of families are selected as if the individuals are unrecognized.

In some embodiments, the aggregating comprises averaging.

In some embodiments, the distances are determined using a cosine distance.

In some embodiments, the method comprises sorting, based on the distances, the families for the individuals, from a family that most resembles an individual to a family that least resembles the individual, or vice versa.

In some embodiments, the sorting generates an exponential curve for each individual.

In some embodiments, determining the probability distribution comprises performing the softmax function on the exponential curve for each individual.

In some embodiments, the sorted arrangement is a sorted ascending arrangement. In some embodiments, the sorted ascending arrangement is a vector that represents an expected confidence for each individual.

In some embodiments, the method comprises sorting, based on the distances, the families for the subject, from a family that most resembles the subject to a family that least resembles the subject; and determining the probability distribution for the subject using the softmax function.

Some aspects include a tangible, non-transitory, machine-readable medium storing instructions that when executed by a data processing apparatus cause the data processing apparatus to perform operations including the above-mentioned method.

Some aspects include a system, including: one or more processors; and memory storing instructions that when executed by the processors cause the processors to effectuate operations of the above-mentioned method.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
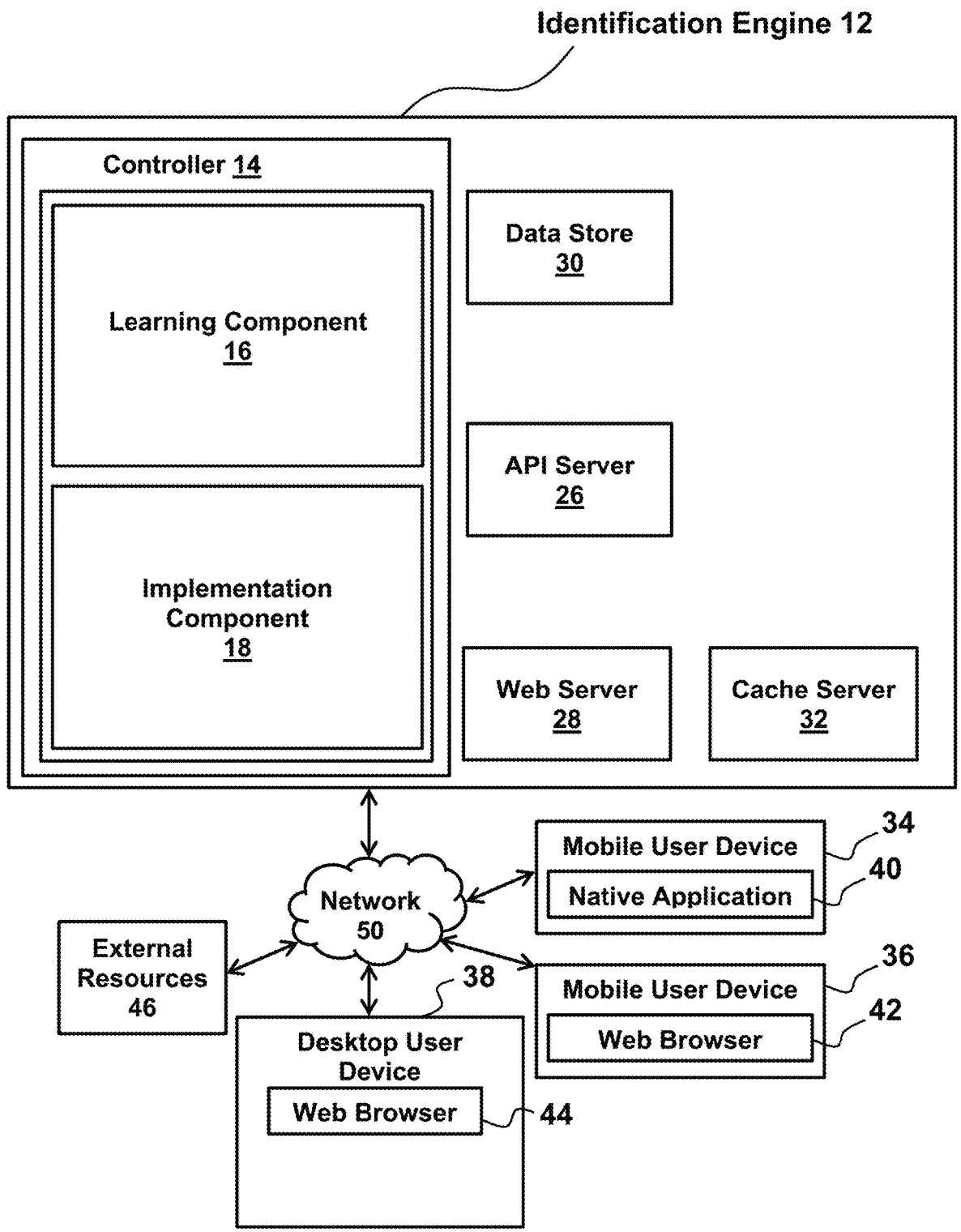
FIG. 1 is a logical-architecture block diagram that illustrates a system including a identification engine and other components as described herein configured for determining confidence scores for facial image based family relation (e.g., kinship) determinations.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of facial recognition and/or others. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 illustrates a system 10 comprising an identification engine 12 and other components configured to search an image of an unrecognized subject in an image gallery of families. System 10 is configured to recognize the subject's family even if the subject is not imaged in the image gallery themselves by exploiting a genetic similarity of facial features between family members. System 10 is also configured to determine a confidence that a family recognition is correct.

These and other benefits are described in greater detail below, after introducing the components of system 10 and describing their operation. It should be noted, however, that not all embodiments necessarily provide all of the benefits outlined herein, and some embodiments may provide all or a subset of these benefits or different benefits, as various engineering and cost tradeoffs are envisioned, which is not to imply that other descriptions are limiting.

In some embodiments, identification engine 12 is executed by one or more of the computers described below with reference to FIG. 6 and may include one or more of a controller 14, an application program interface (API) server 26, a web server 28, a data store 30, and a cache server 32. These components, in some embodiments, communicate with one another in order to provide the functionality of identification engine 12 described herein. As described in greater detail below, in some embodiments, data store 30 may store and/or access data comprising one or more image galleries of families and/or other data.

Cache server 32 may expedite access to this data by storing likely relevant data in relatively high-speed memory, for example, in random-access memory or a solid-state drive. Web server 28 may serve webpages having graphical user interfaces that display one or more views that facilitate searching an image of an unrecognized subject in the image gallery of families, recognizing the subject's family even if the subject is not imaged in the image gallery themselves by exploiting a genetic similarity of facial features between family members, determining a confidence that a family recognition is correct, displaying some and/or all of this or related information, and/or other views. API server 26 may serve data to various applications that process data related to user requested subject identifications, or other data. The operation of these components 26, 28, and 30 may be coordinated by controller 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

In some embodiments, interaction with users and/or other entities may occur via a website or a native application viewed on a desktop computer, tablet, or a laptop of the user. In some embodiments, such interaction occurs via a mobile website viewed on a smart phone, tablet, or other mobile user device, or via a special-purpose native application executing on a smart phone, tablet, or other mobile user device. Data (e.g., a gallery of images) may be extracted by controller 14 and/or other components of system 10 from data store 30 and/or other sources inside or outside system 10 in a secure and encrypted fashion. Data extraction by controller 14 may be configured to be sufficient for system 10 to function as described herein, without compromising privacy and/or other requirements associated with a data source. Facilitating secure subject identity determinations across a variety of devices is expected to make it easier for the users to complete identifications when and where convenient for the user, and/or have other advantageous effects.

To illustrate an example of the environment in which identification engine 12 operates, the illustrated embodiment of FIG. 1 includes a number of components with which identification engine 12 communicates: mobile user devices 34 and 36; a desk-top user device 38; and external resources 46. Each of these devices communicates with identification engine 12 via a network 50, such as the Internet or the Internet in combination with various other networks, like local area networks, cellular networks, Wi-Fi networks, or personal area networks.

Mobile user devices 34 and 36 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user devices 34 and 36 may store instructions that when executed by the associated processor provide an operating system and various applications, including a web browser 42 or a native mobile application 40. The desktop user device 38 may also include a web browser 44. In addition, desktop user device 38 may include a monitor; a keyboard; a mouse; memory; a processor; and a tangible, non-transitory, machine-readable memory storing instructions that when executed by the processor provide an operating system and the web browser and/or the native application 40.

Native application 40 and web browsers 42 and 44, in some embodiments, are operative to provide a graphical user interface associated with a user, for example, that communicates with identification engine 12 and facilitates user interaction with data from identification engine 12. In some embodiments, identification engine 12 may be stored on and/or otherwise be executed user computing resources (e.g., a user computer, server, etc., such as mobile user devices 34 and 36, and desktop user device 38 associated with a user), servers external to the user, and/or in other locations. In some embodiments, identification engine 12 may be run as an application (e.g., an app such as native application 40) on a user server, a user computer, and/or other devices.

Web browsers 42 and 44 may be configured to receive a website from identification engine 12 having data related to instructions (for example, instructions expressed in JavaScript™) that when executed by the browser (which is executed by the processor) cause mobile user device 36 and/or desktop user device 38 to communicate with identification engine 12 and facilitate user interaction with data from identification engine 12. Native application 40 and web browsers 42 and 44, upon rendering a webpage and/or a graphical user interface from identification engine 12, may generally be referred to as client applications of identification engine 12, which in some embodiments may be referred to as a server. Embodiments, however, are not limited to client/server architectures, and identification engine 12, as illustrated, may include a variety of components other than those functioning primarily as a server. Three user devices are shown, but embodiments are expected to interface with substantially more, with more than 100 concurrent sessions and serving more than 1 million users distributed over a relatively large geographic area, such as a state, the entire United States, and/or multiple countries across the world.

External resources 46, in some embodiments, include sources of information such as databases (e.g., which may store one or more image galleries of faces), websites, etc.; external entities participating with the system 10 (e.g., systems or networks associated with security organizations, genealogy information providers, image galleries, etc.), one or more servers outside of the system 10, a network (e.g., the internet), electronic storage, equipment related to Wi-Fi™ technology, equipment related to Bluetooth® technology, data entry devices, or other resources. In some implementations, some or all of the functionality attributed herein to external resources 46 may be provided by resources included in system 10. External resources 46 may be configured to communicate with identification engine 12, mobile user devices 34 and 36, desktop user device 38, and/or other components of the system 10 via wired and/or wireless connections, via a network (e.g., a local area network and/or the internet), via cellular technology, via Wi-Fi technology, and/or via other resources.

Thus, identification engine 12, in some embodiments, operates in the illustrated environment by communicating with a number of different devices and transmitting instructions to various devices to communicate with one another. The number of illustrated external resources 46, desktop user devices 38, and mobile user devices 36 and 34 is selected for explanatory purposes only, and embodiments are not limited to the specific number of any such devices illustrated by FIG. 1, which is not to imply that other descriptions are limiting.

Identification engine 12 may include a number of components introduced above that facilitate searching an image of an unrecognized subject in one or more image galleries of families, recognizing the subject's family even if the subject is not imaged in any of the image galleries themselves by exploiting a genetic similarity of facial features between family members, and determining a confidence that a family recognition is correct. For example, the illustrated API server 26 may be configured to communicate images, image galleries, and/or other information via a protocol, such as a representational-state-transfer (REST)-based API protocol over hypertext transfer protocol (HTTP) or other protocols. Examples of operations that may be facilitated by the API server 26 include requests to access or retrieve portions or all of one or more image galleries of families, and/or other information. API requests may identify which data is to be displayed (e.g., images, an indication of a determined family recognition, a confidence level associated with a determination, etc.), linked, modified, added, or retrieved by specifying criteria for identifying records, such as queries for retrieving or processing information about a particular subject (e.g., a subject's image as described herein), for example. In some embodiments, the API server 26 communicates with the native application 40 of the mobile user device 34 or other components of system 10.

The illustrated web server 28 may be configured to display, link, modify, add, or retrieve portions or all of images, an indication of a determined family recognition, a confidence level associated with a determination, and/or other information encoded in a webpage (e.g. a collection of resources to be rendered by the browser and associated plug-ins, including execution of scripts, such as JavaScript™, invoked by the webpage). In some embodiments, the graphical user interface presented by the webpage may include inputs by which the user may enter or select data, such as clickable or touchable display regions or display regions for text input. For example, an image of an unrecognized subject may be uploaded. Such inputs may prompt the browser to request additional data from the web server 28 or transmit data to the web server 28, and the web server 28 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 28 may communicate with web browsers, such as the web browser 42 or 44 executed by user devices 36 or 38. In some embodiments, the webpage is modified by the web server 28 based on the type of user device, e.g., with a mobile webpage having fewer and smaller images and a narrower width being presented to the mobile user device 36, and a larger, more content rich webpage being presented to the desk-top user device 38. An identifier of the type of user device, either mobile or non-mobile, for example, may be encoded in the request for the webpage by the web browser (e.g., as a user agent type in an HTTP header associated with a GET request), and the web server 28 may select the appropriate interface based on this embedded identifier, thereby providing an interface appropriately configured for the specific user device in use.

The illustrated data store 30, in some embodiments, stores and/or is configured to access images and/or image galleries of families and/or other information. Data store 30 may include various types of data stores, including relational or non-relational databases, image collections, document collections, and/or memory images, for example. Such components may be formed in a single database, or may be stored in separate data structures. In some embodiments, data store 30 comprises electronic storage media that electronically stores information. The electronic storage media of data store 30 may include one or both of system storage that is provided integrally (i.e., substantially non-removable) with system 10 and/or other storage that is connectable (wirelessly or via a wired connection) to system 10 via, for example, a port (e.g., a USB port, a firewire port, etc.), a drive (e.g., a disk drive, etc.), a network (e.g., the Internet, etc.). Data store 30 may be (in whole or in part) a separate component within system 10, or data store 30 may be provided (in whole or in part) integrally with one or more other components of system 10 (e.g., controller 14, external resources 46, etc.). In some embodiments, data store 30 may be located in a data center (e.g., a data center associated with a user), in a server that is part of external resources 46, in a computing device 34, 36, or 38, and/or in other locations. Data store 30 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), or other electronically readable storage media. Data store 30 may store software algorithms, information determined by controller 14, information received via the graphical user interface displayed on computing devices 34, 36, and/or 38, information received from external resources 46, or other information accessed by system 10 to function as described herein.

Controller 14 is configured to coordinate the operation of the other components of identification engine 12 to provide the functionality described herein. Controller 14 may be formed by one or more processors, for example. Controlled components may include one or more of a learning component 16, an implementation component 18, and/or other components. Controller 14 may be configured to direct the operation of components 16 and/or 18 by software; hardware; firmware; some combination of software, hardware, or firmware; or other mechanisms for configuring processing capabilities.

It should be appreciated that although components 16 and 18 are illustrated in FIG. 1 as being co-located, one or more of components 16 or 18 may be located remotely from the other components. The description of the functionality provided by the different components 16 and/or 18 described below is for illustrative purposes, and is not intended to be limiting, as any of the components 16 and/or 18 may provide more or less functionality than is described, which is not to imply that other descriptions are limiting. For example, one or more of components 16 and/or 18 may be eliminated, and some or all of its functionality may be provided by others of the components 16 and/or 18, again which is not to imply that other descriptions are limiting. As another example, controller 14 may be configured to control one or more additional components that may perform some or all of the functionality attributed below to one of the components 16 and/or 18. In some embodiments, identification engine 12 (e.g., controller 14 in addition to cache server 32, web server 28, and/or API server 26) is executed in a single computing device, or in a plurality of computing devices in a datacenter, e.g., in a service oriented or micro-services architecture.

Learning component 16 is configured to select images of individuals from an image gallery of families. In some embodiments, the image gallery of families comprises an image of a face of at least one person in each family and at least one face photo for each person. The images of the individuals from the image gallery of families may be randomly selected. In some embodiments, the images of at least 10, 100, 1000, or 10000 or more of the individuals from the image gallery of families are (randomly) selected. The images of the individuals from the image gallery of families are selected as if the individuals are unrecognized (e.g., so that learning may occur as described herein).

Figure 2:
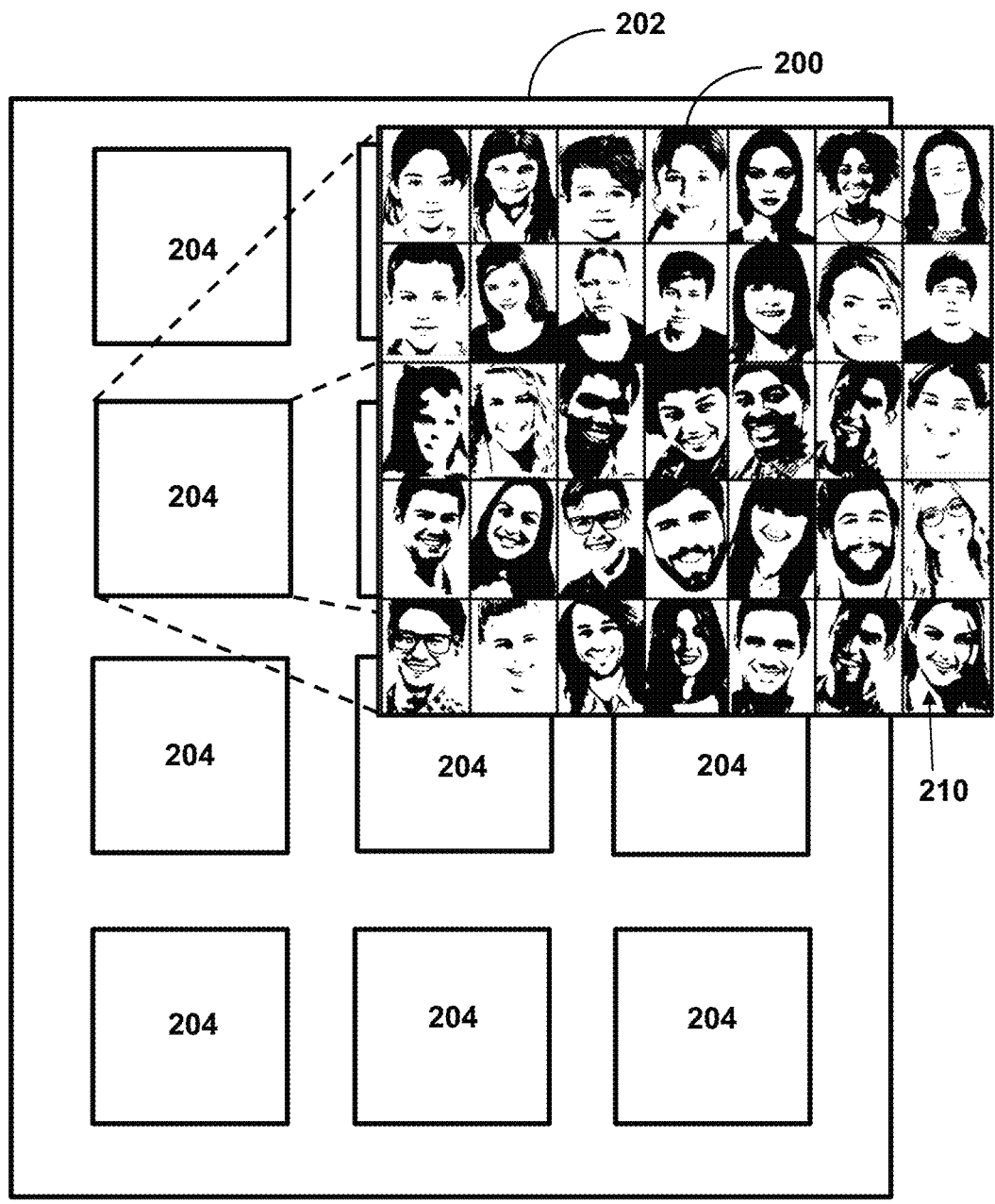
FIG. 2 is a schematic illustration of images of individuals from an image gallery of families.

For example, FIG. 2 is a schematic illustration of images 200 of individuals from an image gallery 202 of families 204. As shown in FIG. 2, the image gallery 202 of families 204 comprises an image of a face of at least one person (see all of the people in broken out (e.g., as indicated by the dotted lines) family 204 shown in FIG. 2) in each family 204 and at least one face photo 210 for each person. In some embodiments, the images 200 of individuals and/or the image gallery 202 of families 204 may be automatically obtained by learning component 16 (FIG. 1) from one or more electronically accessible databases and/or other sources. As described herein, these databases may be provided within and/or outside of system 10 (e.g., by data store 30 and/or external resources 46 shown in FIG. 1). The information may be automatically obtained based on a user request, based on an image upload of an unknown subject, and/or based on other prompts.

In some embodiments, the images of individuals (e.g., the selected individuals and/or other individual with images in the image gallery 202 of families 204) may be and/or include two and/or three dimensional images, or sets of images of an individual's face and/or head. The images of individuals may be captured with still cameras, video cameras, may be generated by a model generation system, and/or may be generated by other methods. The images of individuals may include pre-labeled points of interest, reference points, linear and surface area topography, volumetric data, an indication of whether two or more of the images are from members of the same family, and/or other data.

Returning to FIG. 1, learning component 16 is configured to extract facial features for the individuals (e.g., the selected individuals and/or other individuals with images in the image gallery 202 of families 204) from the images. There may be genetic similarity of facial features between individuals from the same family in the images. This genetic similarity may be used for identification and confidence determination, as described below. Genetic similarity may comprise genetic relatedness among individuals in the family. Facial features may be similar between family members because family members share the same genes, and/or for other reasons. Because the representation of various facial features corresponds to their appearance in the image, if a certain facial feature is similar between family members due to similar genetics, a numeric representation of that facial feature will also be similar. An aggregated representation of a family tends to have the general facial feature representation of the family, not just an individual's.

A "face" or uses of the word "facial" refer to any area of a person's neck, face, head, ears, or other related areas of the body. For example, a reference to "face" or "facial" may include any area of a person above the shoulders or collar bones. In some embodiments, extracted facial features comprise a size, location, relative location, distance between, etc., of parts (e.g., eyes, eye sockets, nose, cars, etc.) of a face, and/or topographical landmarks of the face (e.g. bridge of the nose, dimple of a chin, etc.), colors of parts of the face (e.g., eye color, hair color, skin color, etc.), determinations made based on such data (e.g., whether a face appears male or female), a facial volume, full face width, full face length, nose breadth (these are just examples), and/or other facial features. Note that the principles described herein may also be used with other representations of family members (beyond just facial features) such as sequence based features (e.g., a gait-way of walking), a full body appearance, voice features, and/or any other representation of a person.

Figure 3:
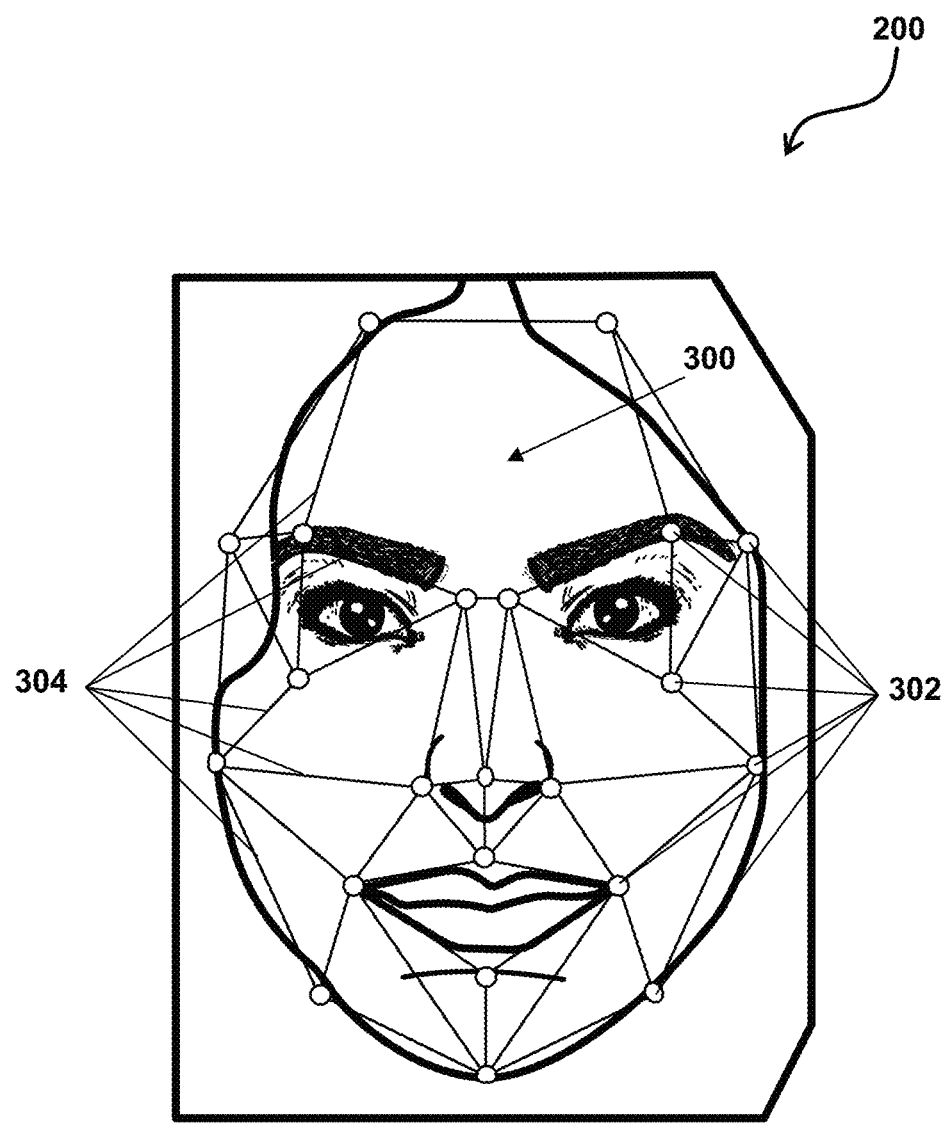
FIG. 3 illustrates an image of an individual from an image gallery of families (e.g., an image of an individual from the image gallery of families shown in FIG. 2).

As a facial feature example, FIG. 3 illustrates an image 200 of a face 300 of an individual from an image gallery (e.g., 202 shown in FIG. 2) of families (e.g., 204 shown in FIG. 2). As described above, learning component 16 (FIG. 1) is configured to extract facial features for the individuals from the images. In this example, various extracted facial features are indicated by the dots 302 and/or lines 304 shown on face 300. In some embodiments, learning component 16 (FIG. 1) may be configured to determine locations of dots 302, distances between dots 302, shapes of lines 304, and/or other information. In this example, extracted facial features comprise a shape, size, location, relative location, distance between, etc., of parts (e.g., eyes, eye sockets, nose, cars, etc.) of face 300, topographical landmarks of face 300 (e.g. bridge of the nose, dimple of a chin, etc.), determinations made based on such data (e.g., face 300 appears female), full face width (see combination of lines 304 from cheek bone to cheekbone of face 300, and nose breadth (see dots 302 on either side of the nose of face 300 and the line 304 between those two dots). Again, these are just some representative examples of many more and/or different possibilities.

In some embodiments, extracting facial features comprises converting the images 200 (FIG. 2, FIG. 3) in the image gallery 202 (FIG. 2) of families 204 (FIG. 2) to numerical data for analysis and/or other operations. As shown in FIG. 3, the data may be representative of the shape, size, location, relative location, distance between, etc., the parts (e.g., eyes, eye sockets, nose, cars, etc.) of a face, and/or topographical landmarks of the face (e.g. bridge of the nose, dimple of a chin, etc.), colors of parts of the face (e.g., eye color, hair color, skin color, etc.), determinations made based on such data (e.g., whether a face appears male or female), full face width, full face length, nose breadth, and/or other facial features, information related to three dimensional facial and head topography data (e.g., linear, surface area, and volumetric data), two dimensional image measurements, facial dimensions, and/or other information. In some embodiments, the numerical data may include points of interest, reference points, linear and surface area topography, volumetric data, etc., from three dimensional facial images that has been converted to numerical values for mathematical computation and analysis, and/or other numerical data. In some embodiments, the data comprises millions of individual data points.

Returning to FIG. 1, learning component 16 is configured to aggregate facial features for family members of the families in the image gallery of families. Aggregating may comprise averaging, for example, and/or other aggregating. For example, images of various individuals may be labeled as and/or known to be family members (e.g., so they can be stored as or formed into image gallery 202 of families 204 as shown in FIG. 2). For some or all of the individuals in a given family, learning component 16 may average and/or otherwise aggregate some or all of the facial features such as the shape, size, location, relative location, distance between, etc., of parts (e.g., eyes, eye sockets, nose, cars, etc.) of a face, and/or topographical landmarks of the face (e.g. bridge of the nose, dimple of a chin, etc.), colors of parts of the face (e.g., eye color, hair color, skin color, etc.), determinations made based on such data (e.g., whether a face appears male or female), a facial volume, full face width, full face length, nose breadth (these are just examples), and/or other facial features described above with respect to FIG. 3. This may produce one aggregated measure for each facial feature, for each family, for example. In some embodiments, the extracted facial features may be representative of a given individual. In some embodiments, the extracted facial features for each individual in a family may be formed into a single aggregated representation of a family, whether a single number or multiple numbers, i.e. a vector. Such a vector is a collection of numbers representing various facial features, for example.

Learning component 16 is configured to determine distances from the individuals (e.g., the selected individuals described above) to the families based on the (aggregated) extracted facial features and/or other information. For example, in some embodiments, learning components 16 may be configured to determine a vector associated with a selected individual using and/or based on one or more extracted facial features for that individual. Learning component 16 may determine aggregated family vectors for the individual families based on the aggregated extracted facial features for each family. A distance from a selected individual to a given family may be a distance between the vector for the individual, and an aggregated family vector.

As another example of one or more of the operations described above, learning component 16 may randomly select and extract an image of a single person from a dataset (e.g., the image gallery of families described above) and try to find his family as if he was never in the image gallery. This is repeated 1000 times, but each time for a single person. Learning component 16 is configured to calculate the aggregated feature vector of the families without the extracted individual and perform distance calculations from each individual to each family (e.g., each family 204 shown in FIG. 2) based on the extracted and aggregated facial features for the families, as if each of the 1000 individuals is unrecognized. The result is a vector of distances to all families in the dataset. As an example, the distances may be calculated using a cosine distance, but other techniques can be employed. The cosine distance results in values ranging from −1 to 1, where −1 denotes exactly opposite, 1 denotes exactly the same person, and 0 denotes orthogonal (meaning no correlation at all). Values in between denote intermediate similarity or dissimilarity.

Learning component 16 is configured to sort, based on the distances, each family for each individual, from a family that most resembles an individual (e.g., where a determined cosine distance is high, approaching one) to a family that least resembles the individual (e.g., with a cosine distance typically around 0). The sorting may be used to generate a curve for each individual. The typical curve is exponential, showing that few of the families resemble the test individual and most families are more distant and reside on the flat side of the curve.

Learning component 16 is configured to determine probability distributions for the individuals such that distances from the individuals to the families are associated with probabilities. A family that most resembles an individual has the highest or maximum probability for that individual. The probability distributions may be determined based on the sorting using a softmax function such that each distance from each individual to each family is associated with a probability, the family that most resembles the individual has the highest probability for the individual, and the sum of all family probabilities sums to one once the softmax function is applied. Note that other mathematical operations that normalize the distances and make them comparable between tests may be used.

Figure 4:
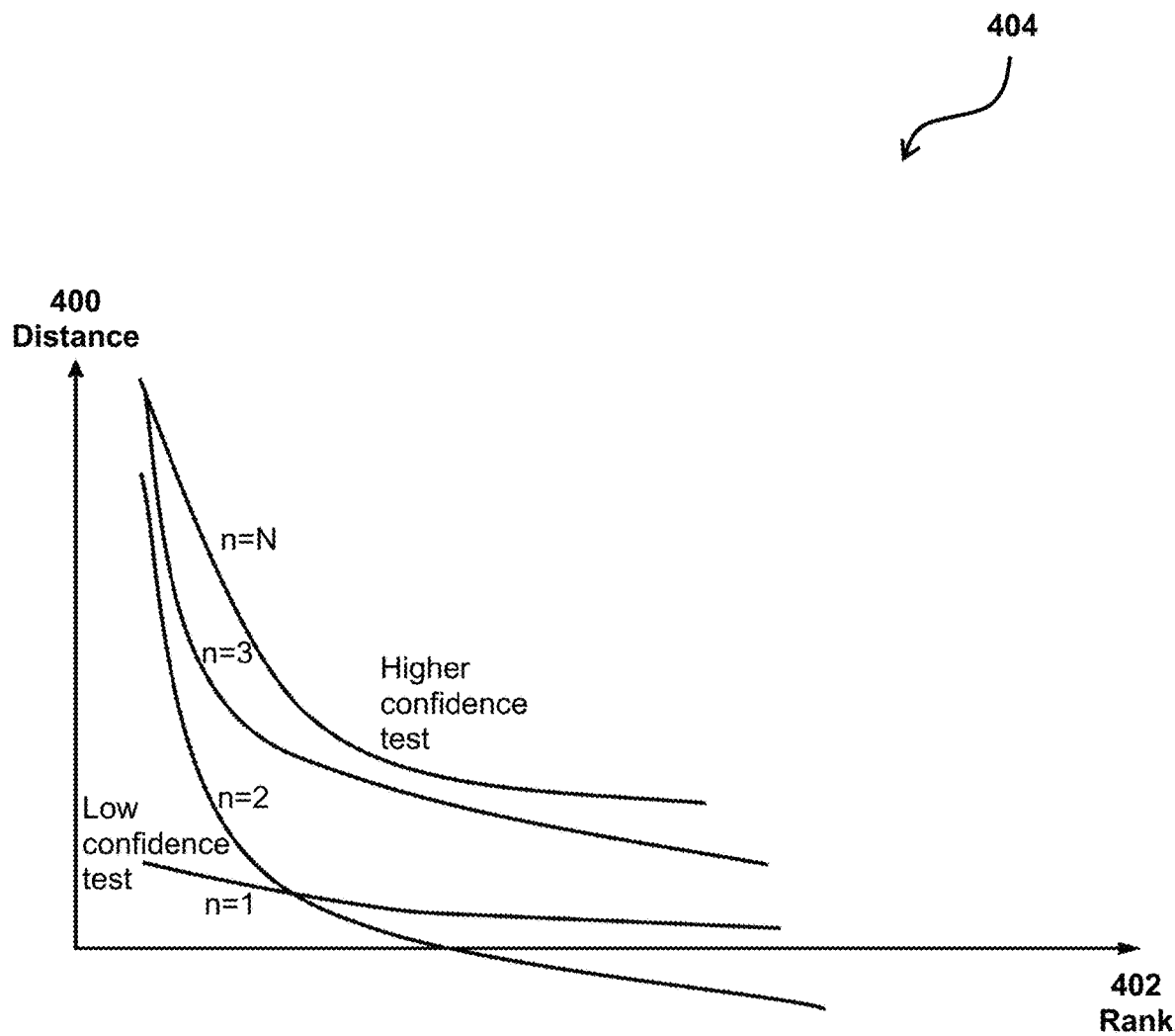
FIG. 4 illustrates distance versus rank curves generated for different individuals.

For example, FIG. 4 illustrates distance 400 versus rank 402 curves 404 generated for different individuals (n=1, 2, 3, . . . , N). As described above, each curve 404 is generated based on sorted distances from each individual to each family. In FIG. 4, each curve is exponential, showing that few of the families resemble the test individual (e.g., few families have a high cosine distance score in this example) and most families are more distant and reside on the flat side of the curve (e.g., with a low rank). A high confidence test means a person whose first ranked families are higher than another person's first ranked families, for example.

The softmax function converts a vector of real numbers into a probability distribution. With reference to FIG. 4, the softmax function is applied to each curve 404 (which represents families sorted based on distances), and generates a corresponding probability distribution such that the sum of all family probabilities sums to one once the softmax function is applied. A family that most resembles an individual is associated with the largest fraction (e.g., the highest or max probability) of the summation to one. This facilitates later comparison of distances to other individuals. Since normalization was performed with the softmax function, each distance now has a probability score, where the closest (distance) score gets the highest probability. If there are multiple families close to a test individual, each one gets a lower probability compared to queries where there are less results that are close to the test individual. In that sense, search queries with more ambiguity as for the correct family get penalized with a lower probability on each of the top results.

Learning component 16 (FIG. 1) is configured to determine a sorted arrangement of the highest or max probabilities of related families for the individuals. The sorted arrangement may be a sorted ascending arrangement, but other sorted arrangements are possible. For example, learning component 16 may be configured to take the highest or max (most similar) probability result for each of 1000 different individuals, and graph or otherwise arrange them in a sorted ascending vector of 1000 individuals. The graph represents the expected confidence for each absolute (test) individual.

Figure 5:
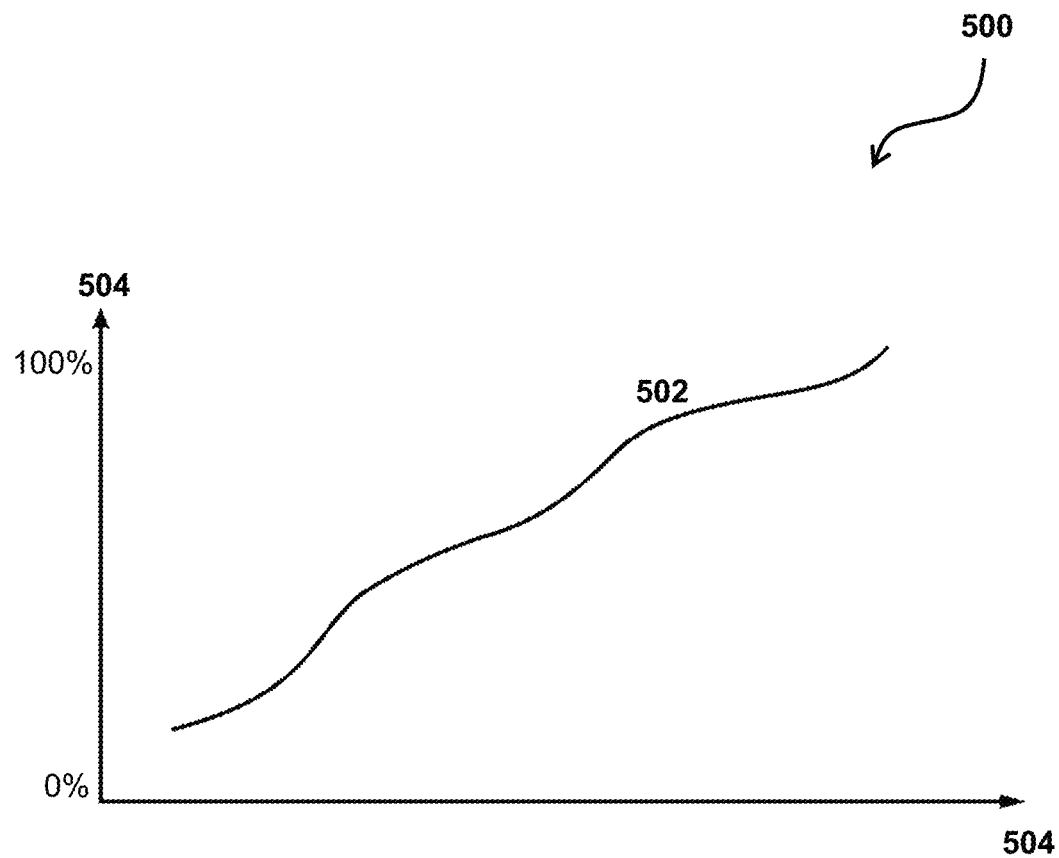
FIG. 5 illustrates an example graph of a sorted (ascending in this example) arrangement of the highest or max probabilities of related families for individuals.

FIG. 5 illustrates an example graph 500 of a sorted (ascending in this example) arrangement 502 of the highest or max probabilities 504 of related families for individuals 506. As a reminder, only a family that most resembles an individual has a highest or maximum probability for that individual. In this example, learning component 16 has taken the highest or max (most similar) probability result for each of 1000 different individuals, and graphed (graph 500) them in a sorted ascending vector of 1000 individuals. Advantageously, units of distance are no longer needed.

Returning to FIG. 1, implementation component 18, responsive to receiving an image of an unrecognized subject, is configured to determine distances from the subject to the families. The distances are determined based on extracted facial features from the image of the subject and the aggregated facial features (e.g., as described above), and/or other information. A probability distribution is determined for the subject such that the distances from the subject to the families are associated with a probability. A family that most resembles the subject has the highest probability for the subject. The highest probability for the subject is determined using the softmax function and the distances (e.g., again as described above). For example, implementation component 18 may be configured to sort, based on the distances, the families for the subject, from a family that most resembles the subject to a family that least resembles the subject; and determine the probability distribution for the subject using the softmax function.

Implementation component 18 is configured to place the highest probability for a subject on the sorted arrangement to determine the corresponding family associated with the highest probability for the subject and a corresponding confidence. When a user attempts to find relatives of a new test subject, implementation component 18 calculates the softmax function of the gallery distances and takes the highest probability. Implementation component 18 places this probability on graph 500 shown in FIG. 5 and determines which corresponding test individual is associated with this probability. If, for example, the probability correlates to a test individual #700 out of 1000, the confidence is 70%.

In some embodiments, implementation component 18 is configured to output the corresponding family associated with the highest probability for the unrecognized subject and the corresponding confidence for display (e.g., on one or more of the computing systems and/or user interfaces described above). In some embodiments, a confidence score may be found for each search result and displayed on a user interface (as described herein) to the user.

In some embodiments, one or more components of identification engine 12 may be configured to train an algorithm using input output training image pairs and/or other information that show a subject and family members of the subject, and/or other data that describe a subject and the subject's family, for a population of individuals. In some embodiments, learning component 16 is configured to cause the algorithm to learn to predict a new subject's (e.g. a subject not included in the input output training image pairs) family based on the input output training pairs. In some embodiments, future predictions of unknown subject's families may be determined based on the trained algorithm.

In some embodiments, the algorithm may comprise one or more individual algorithms. In some embodiments, an algorithm may be a machine learning algorithm. In some embodiments, the machine learning algorithm may be or include a neural network, classification tree, decision tree, support vector machine, or other model that is trained (e.g., with a stochastic gradient descent) and configured to determine the financial capacity of a user. As an example, neural networks may be based on a large collection of neural units (or artificial neurons). Neural networks may loosely mimic the manner in which a biological brain works (e.g., via large clusters of biological neurons connected by axons). Each neural unit of a neural network may be simulated as being connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

It should be noted that in some embodiments, identification engine 12 may be configured such that in the above mentioned operations of the controller 14, input from users and/or sources of information inside or outside system 10 may be processed by controller 14 through a variety of formats, including clicks, touches, uploads, downloads, etc., The illustrated components (e.g., controller 14, API server 26, web server 28, data store 30, and cache server 32) of identification engine 12 are depicted as discrete functional blocks, but embodiments are not limited to systems in which the functionality described herein is organized as illustrated by FIG. 1. The functionality provided by each of the components of identification engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 6:
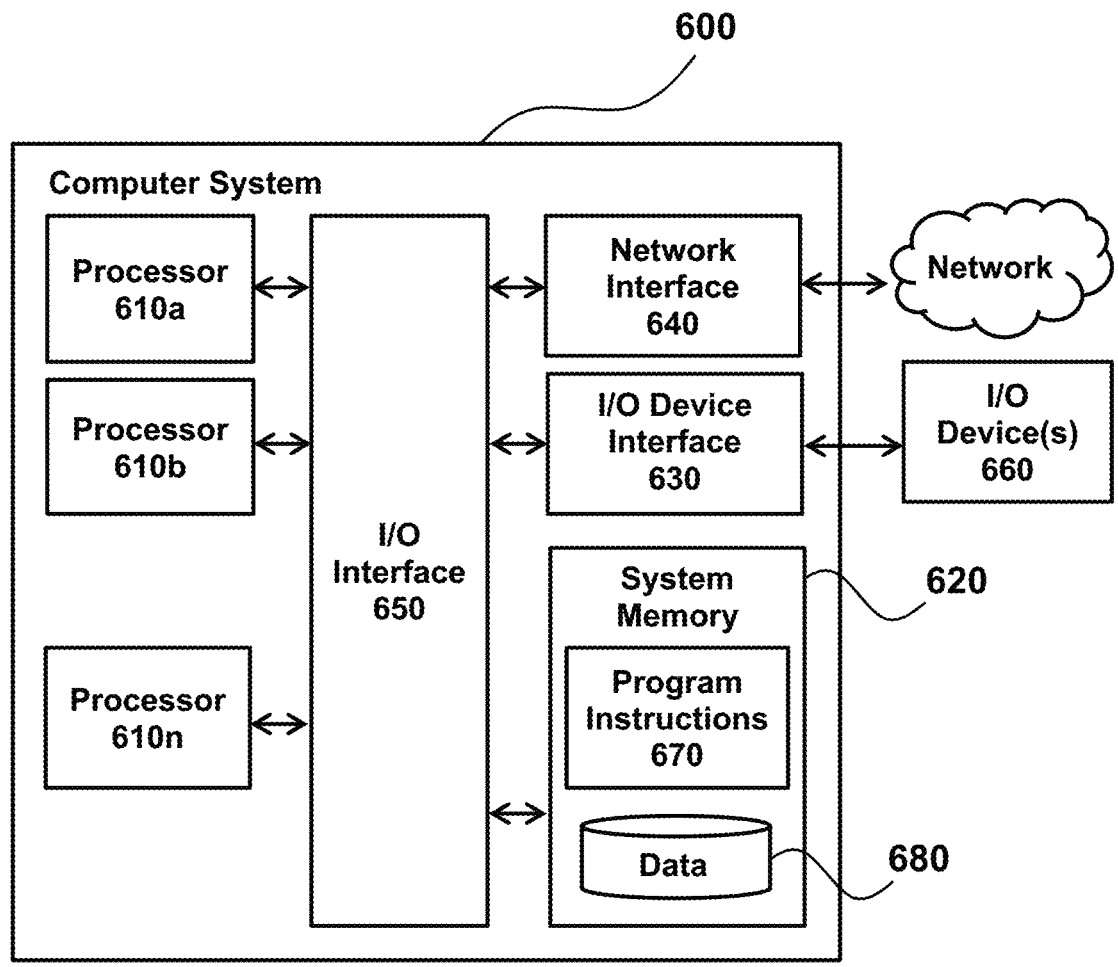
FIG. 6 is a diagram that illustrates an exemplary computing system in accordance with embodiments of the present system.

FIG. 6 is a diagram that illustrates an exemplary computer system 600 in accordance with embodiments of the present system. Various portions of systems and methods described herein may include or be executed on one or more computer systems the same as or similar to computer system 600. For example, identification engine 12, mobile user device 34, mobile user device 36, desktop user device 38, external resources 46 and/or other components of the system 10 (FIG. 1) may be and/or include one more computer systems the same as or similar to computer system 600. Further, processes, modules, processor components, and/or other components of system 10 described herein may be executed by one or more processing systems similar to and/or the same as that of computer system 600.

Computer system 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computer system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on a remote computer system, for example, may be connected to computer system 600 via a network and network interface 640.

Network interface 640 may include a network adapter that provides for connection of computer system 600 to a network. Network interface may 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Instructions 670 may include modules and/or components (e.g., components 16 and 18 shown in FIG. 1) of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a television or device connected to a television (e.g., Apple TV™), or a Global Positioning System (GPS), or the like. Computer system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 7:
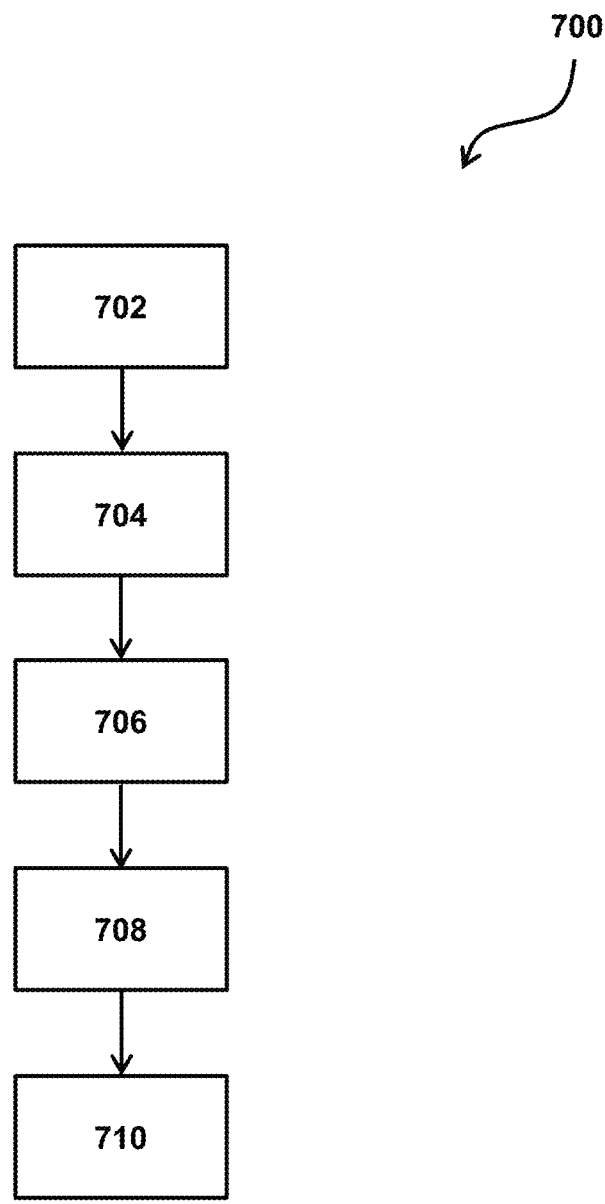
FIG. 7 is a flow chart that illustrates a process for searching an image of an unrecognized subject in an image gallery of families, recognizing the subject's family even if the subject is not imaged in the image gallery themselves by exploiting a genetic similarity of facial features between family members, and determining a confidence that a family recognition is correct.

FIG. 7 is a flowchart of a method 700 for searching for an image of an unrecognized subject in an image gallery of families, recognizing the subject's family even if the subject is not imaged in the image gallery themselves by exploiting a genetic similarity of facial features between family members, and determining a confidence that a family recognition is correct. Method 700 may be performed with some embodiments of system 10 (FIG. 1), computer system 600 (FIG. 6), and/or other components discussed above. Method 700 includes a learning phase (e.g., operations 702-706) and an implementation phase (e.g., operations 708 and/or 710). These phases may be performed separately or together, and in any order. Method 700 may include additional operations that are not described, and/or may not include one or more of the operations described below. The operations of method 700 may be performed in any order that facilitates correct (or high confidence) family recognition determinations, as described herein.

Method 700 begins with operation 702, comprising selecting images of individuals from an image gallery of families, extracting facial features for the individuals from the images, and determining distances from the individuals to the families based on the extracted facial features and aggregating facial features for family members of the families in the image gallery of families. Aggregating may comprise averaging, for example, and/or other aggregating. The determined distances may comprise cosine and/or other distances, for example. In some embodiments, determined distances comprise vectors.

In some embodiments, the image gallery of families comprises an image of a face of at least one person in each family and at least one face photo for each person. The images of the individuals from the image gallery of families may be randomly selected. In some embodiments, the images of at least 10, 100, 1000, or 10000 or more individuals from the image gallery of families are selected. The images of the individuals from the image gallery of families are selected as if the individuals are unrecognized (e.g., so that learning may occur as described herein).

Method 700 continues with operation 704, comprising sorting, based on the distances, each family for each individual, from a family that most resembles an individual (e.g., where a determined cosine distance is high, approaching one) to a family that least resembles the individual (e.g., with a cosine distance typically around 0). The sorting may be used to generate a curve for each individual. The typical curve is exponential, showing that few of the families resemble the test individual and most families are more distant and reside on the flat side of the curve.

Operation 706 includes determining probability distributions for the individuals such that distances from the individuals to the families are associated with probabilities. A family that most resembles an individual has the highest probability for that individual. The probability distributions may be determined based on the sorting using a softmax function such that each distance from each individual to each family is associated with a probability, wherein the family that most resembles the individual has a highest probability for the individual, and the sum of all family probabilities sums to one once the softmax function is applied. Operation 706 includes determining a sorted ascending arrangement of highest probabilities for each individual.

At operation 708, responsive to receiving an image of an unrecognized subject, distances from the subject to the families are determined based on extracted facial features from the image of the subject and the aggregated facial features, and/or other information. A probability distribution is determined for the subject such that the distances from the subject to the families are associated with a probability. A family that most resembles the subject has the highest probability for the subject. The highest probability for the subject is determined using the softmax function and the distances.

In some embodiments, operation 708 comprises sorting, based on the distances, the families for the subject, from a family that most resembles the subject to a family that least resembles the subject; and determining the probability distribution for the subject using the softmax function.

Operation 708 comprises comparing the highest probability for the subject to the sorted arrangement of highest probabilities of related families to determine a corresponding family associated with the highest probability for the subject. A comparison comprises placing the highest probability for the subject on the sorted arrangement to determine the corresponding family associated with the highest probability for the subject and a corresponding confidence.

Operation 710 comprises outputting the corresponding family associated with the highest probability for the unrecognized subject and the corresponding confidence for display (e.g., on one or more of the computing systems and/or user interfaces described above).

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a." "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing." "calculating," "determining" or the like refer to actions or processes of a specific apparatus, such as a special purpose computer or a similar special purpose electronic processing/computing device.

The present techniques will be better understood with reference to the following enumerated embodiments:

1. A non-transitory computer readable medium having instructions thereon, the instructions when executed by a computer, causing the computer to search an image of an unrecognized subject in an image gallery of families, recognize the subject's family even if the subject is not imaged in the image gallery themselves by exploiting a genetic similarity of facial features between family members, and determine a confidence that a family recognition is correct, the instructions causing operations comprising: extracting and combining facial features for family members of each family in the image gallery of families; as a preparation step, randomly selecting a quantity of images of individuals from the image gallery of families, temporarily removing an individual form the image gallery of families as if each individual was unrecognized, extracting facial features for each individual from the images, and determining cosine distances from each individual to each family based on the extracted facial features and the combined facial features; sorting, based on the distances, each family for each individual, from a family that most resembles an individual to a family that least resembles the individual; determining probability distributions based on the sorting using a softmax function such that each distance from each individual to each family is associated with a probability, wherein the family that most resembles the individual has a highest probability for the individual and a sum of all family probabilities sums to 1 once the softmax function is applied; determining a sorted ascending arrangement of highest probabilities for each individual; and responsive to receiving the image of the unrecognized subject: determining the softmax function of the gallery distances to obtain a highest probability for the unrecognized subject; placing the highest probability for the unrecognized subject on the sorted ascending arrangement to determine a corresponding family associated with the highest probability for the unrecognized subject and a corresponding confidence; and outputting the corresponding family associated with the highest probability for the unrecognized subject and the corresponding confidence for display.

2. The medium of claim 1, wherein the image gallery of families comprises an image of a face of at least one person in each family and at least one face photo for each person.

3. The medium of claim 1, wherein the cosine distances comprise vectors.

4. The medium of claim 1, wherein the sorting of each family distance to each individual generates a typically exponential curve for each individual.

5. The medium of claim 4, wherein determining the probability distributions based on the sorting using a softmax function comprises performing a softmax function on the exponential curve of distances for each individual.

6. A non-transitory computer readable medium having instructions thereon, the instructions when executed by a computer causing operations comprising: selecting images of individuals from an image gallery of families, extracting facial features for the individuals from the images, and determining distances from the individuals to the families based on the extracted facial features and aggregated facial features for family members of the families in the image gallery of families; determining probability distributions for the individuals such that distances from the individuals to the families are associated with probabilities, wherein a family that most resembles an individual has a highest probability for that individual; determining a sorted arrangement of highest probability of related families for the individuals; and responsive to receiving an image of an unrecognized subject: determining distances from the subject to the families based on extracted facial features from the image of the subject and the aggregated facial features; determining a probability distribution for the subject such that the distances from the subject to the families are associated with a probability, wherein a family that most resembles the subject has a highest probability for the subject, wherein the highest probability is determined using a softmax function and the distances; comparing the highest probability for the subject to the sorted arrangement of highest probabilities of related families to determine a corresponding family associated with the highest probability for the subject, a comparison comprising placing the highest probability for the subject on the sorted arrangement to determine the corresponding family associated with the highest probability for the subject and a corresponding confidence; and outputting the corresponding family associated with the highest probability for the unrecognized subject and the corresponding confidence for display.

7. The medium of claim 6, further comprising extracting and aggregating the facial features for the family members of the families in the image gallery of families.

8. The medium of claim 6, wherein the image gallery of families comprises an image of a face of at least one person in each family and at least one face photo for each person.

9. The medium of claim 6, wherein the images of the individuals from the image gallery of families are randomly selected.

10. The medium of claim 6, wherein the images of at least 10, 100, 1000, or 10000 of the individuals from the image gallery of families are selected.

11. The medium of claim 6, wherein the images of the individuals from the image gallery of families are selected as if the individuals are unrecognized.

12. The medium of claim 6, wherein the aggregating comprises averaging.

13. The medium of claim 6, wherein the determined distances comprise vectors.

14. The medium of claim 6, wherein the distances are determined using a cosine distance.

15. The medium of claim 6, wherein the operations further comprise sorting, based on the distances, the families for the individuals, from a family that most resembles an individual to a family that least resembles the individual, or vice versa.

16. The medium of claim 15, wherein the sorting generates an exponential curve for each individual.

17. The medium of claim 16, wherein determining the probability distribution comprises performing the softmax function on the exponential curve for each individual.

18. The medium of claim 6, wherein the sorted arrangement is a sorted ascending arrangement.

19. The medium of claim 18, wherein the sorted ascending arrangement is a vector that represents an expected confidence for each individual.

20. The medium of claim 6, wherein the operations further comprise sorting, based on the distances, the families for the subject, from a family that most resembles the subject to a family that least resembles the subject; and determining the probability distribution for the subject using the softmax function.

21. A non-transitory computer readable medium having instructions thereon, the instructions when executed by a computer causing operations comprising: determining distances from an unrecognized subject to families based on extracted facial features from an image of the subject and aggregated facial features for the families, the aggregated facial features for the families determined by selecting images of individuals from an image gallery of families, extracting facial features for the individuals from the images, and aggregating facial features for family members of the families in the image gallery of families; determining a probability distribution for the subject such that the distances from the subject to the families are associated with a probability, wherein each family has a probability of being the subject's family; comparing a highest probability for the subject to a sorted arrangement of highest probabilities to determine a corresponding family associated with the highest probability for the subject; the sorted arrangement of highest probabilities determined by determining distances from the individuals to the families based on the extracted facial features, and determining probability distributions for the individuals such that distances from the individuals to the families are associated with probabilities, wherein the highest probability is determined using a softmax function and the distances; wherein a family that most resembles an individual has a highest probability for that individual; and wherein a comparison comprises placing the highest probability for the subject on the sorted arrangement to determine the corresponding family associated with the highest probability for the subject and a corresponding confidence; and outputting the corresponding family associated with the highest probability for the unrecognized subject and the corresponding confidence for display.

22. The medium of claim 21, wherein the aggregating comprises averaging.

23. The medium of claim 21, wherein the distances are determined using a cosine distance.

24. The medium of claim 21, wherein the operations further comprise sorting, based on the distances, the families for the individuals, from a family that most resembles an individual to a family that least resembles the individual, or vice versa.

25. The medium of claim 24, wherein the sorting generates an exponential curve for each individual, and determining the probability distribution comprises performing the softmax function on the exponential curve for each individual.

26. A non-transitory computer readable medium having instructions thereon, the instructions when executed by a computer causing operations comprising:

selecting images of individuals from an image gallery of families, extracting facial features for the individuals from the images, and determining distances from the individuals to the families based on the extracted facial features and aggregated facial features for family members of the families in the image gallery of families; determining probability distributions for the individuals such that distances from the individuals to the families are associated with probabilities, wherein a family that most resembles an individual has a highest probability for that individual; and determining a sorted arrangement of highest probabilities for the individuals.

27. The medium of claim 26, further comprising extracting and aggregating the facial features for the family members of the families in the image gallery of families.

28. The medium of claim 26, wherein the image gallery of families comprises an image of a face of at least one person in each family.

29. The medium of claim 26, wherein the images of the individuals from the image gallery of families are randomly selected.

30. The medium of claim 26, wherein the images of at least 10, 100, 1000, or 10000 of the individuals from the image gallery of families are selected.

31. The medium of claim 26, wherein the images of the individuals from the image gallery of families are selected as if the individuals are unrecognized.

32. The medium of claim 26, wherein the aggregating comprises averaging.

33. The medium of claim 26, wherein the determined distances comprise vectors.

34. The medium of claim 26, wherein the distances are determined using a cosine distance.

35. The medium of claim 26, wherein the operations further comprise sorting, based on the distances, the families for the individuals, from a family that most resembles an individual to a family that least resembles the individual, or vice versa.

36. The medium of claim 35, wherein the sorting generates an exponential curve for each individual.

37. The medium of claim 36, wherein determining the probability distribution comprises performing a softmax function on the exponential curve for each individual.

38. The medium of claim 26, wherein the sorted arrangement is a sorted ascending arrangement.

39. The medium of claim 38, wherein the sorted ascending arrangement is a vector that represents an expected confidence for each individual.

40. The medium of claim 26, wherein the operations further comprise recognizing a subject's family even if the subject is not imaged in the image gallery themselves and so is unrecognized by exploiting a genetic similarity of facial features between family members, and determining a likelihood that a family recognition is correct, even if ground truths that link facial features to families are unknown by: determining a softmax function of the distances to obtain a highest probability for the subject; placing the highest probability for the unrecognized subject on the sorted arrangement to determine to determine a corresponding family associated with the highest probability for the subject and a corresponding confidence; and output the corresponding family associated with the highest probability for the unrecognized subject and the corresponding confidence for display.

41. A method for determining that a family recognition is correct, the method comprising: selecting images of individuals from an image gallery of families, extracting facial features for the individuals from the images, and determining distances from the individuals to the families based on the extracted facial features and aggregated facial features for family members of the families in the image gallery of families; determining probability distributions for the individuals such that distances from the individuals to the families are associated with probabilities, wherein a family that most resembles an individual has a highest probability for that individual; determining a sorted arrangement of highest probability of related families for the individuals; and responsive to receiving an image of an unrecognized subject: determining distances from the subject to the families based on extracted facial features from the image of the subject and the aggregated facial features; determining a probability distribution for the subject such that the distances from the subject to the families are associated with a probability, wherein a family that most resembles the subject has a highest probability for the subject, wherein the highest probability is determined using a softmax function and the distances; comparing the highest probability for the subject to the sorted arrangement of highest probabilities of related families to determine a corresponding family associated with the highest probability for the subject, a comparison comprising placing the highest probability for the subject on the sorted arrangement to determine the corresponding family associated with the highest probability for the subject and a corresponding confidence; and outputting the corresponding family associated with the highest probability for the unrecognized subject and the corresponding confidence for display.

42. The method of claim 41, further comprising extracting and aggregating the facial features for the family members of the families in the image gallery of families.

43. The method of claim 41, wherein the image gallery of families comprises an image of a face of at least one person in each family and at least one face photo for each person.

44. The method of claim 41, wherein the images of the individuals from the image gallery of families are randomly selected.

45. The method of claim 41, wherein the images of at least 10, 100, 1000, or 10000 of the individuals from the image gallery of families are selected.

46. The method of claim 41, wherein the images of the individuals from the image gallery of families are selected as if the individuals are unrecognized.

47. The method of claim 41, wherein the aggregating comprises averaging.

48. The method of claim 41, wherein the determined distances comprise vectors.

49. The method of claim 41, wherein the distances are determined using a cosine distance.

50. The method of claim 41, further comprising sorting, based on the distances, the families for the individuals, from a family that most resembles an individual to a family that least resembles the individual, or vice versa.

51. The method of claim 50, wherein the sorting generates an exponential curve for each individual.

52. The method of claim 51, wherein determining the probability distribution comprises performing the softmax function on the exponential curve for each individual.

53. The method of claim 41, wherein the sorted arrangement is a sorted ascending arrangement.

54. The method of claim 53, wherein the sorted ascending arrangement is a vector that represents an expected confidence for each individual.

55. The method of claim 41, further comprising sorting, based on the distances, the families for the subject, from a family that most resembles the subject to a family that least resembles the subject; and determining the probability distribution for the subject using the softmax function.

What is claimed is:

1. A non-transitory computer readable medium having instructions thereon, the instructions when executed by a computer, causing the computer to search an image of an unrecognized subject in an image gallery of families, recognize the subject's family even if the subject is not imaged in the image gallery themselves by exploiting a genetic similarity of facial features between family members, and determine a confidence that a family recognition is correct, the instructions causing operations comprising:
    extracting and combining facial features for family members of each family in the image gallery of families;
    as a preparatory step, randomly selecting a quantity of images of individuals from the image gallery of families, temporarily removing an individual form the image gallery of families as if each individual was unrecognized, extracting facial features for each individual from the images, and determining distances from each individual to each family based on the extracted facial features and the combined facial features;
    sorting, based on the distances, each family for each individual, from a family that most resembles an individual to a family that least resembles the individual;
    determining probability distributions based on the sorting using a softmax function such that each distance from each individual to each family is associated with a probability, wherein the family that most resembles the individual has a highest probability for the individual and a sum of all family probabilities sums to 1 once the softmax function is applied;
    determining a sorted ascending arrangement of highest probabilities for each individual; and
    responsive to receiving the image of the unrecognized subject:
        determining the softmax function of the gallery distances to obtain a highest probability for the unrecognized subject;
        placing the highest probability for the unrecognized subject on the sorted ascending arrangement to determine to determine a corresponding family associated with the highest probability for the unrecognized subject and a corresponding confidence; and
        outputting the corresponding family associated with the highest probability for the unrecognized subject and the corresponding confidence for display.

2. The medium of claim 1, wherein the image gallery of families comprises an image of a face of at least one person in each family and at least one face photo for each person.

3. The medium of claim 1, wherein the determined distances comprise cosine distances, and the cosine distances comprise vectors.

4. The medium of claim 1, wherein the sorting of each family distance to each individual generates a typically exponential curve for each individual.

5. The medium of claim 4, wherein determining the probability distributions based on the sorting using a softmax function comprises performing a softmax function on the exponential curve of distances for each individual.

6. A non-transitory computer readable medium having instructions thereon, the instructions when executed by a computer causing operations comprising:
    selecting images of individuals from an image gallery of families, extracting facial features for the individuals from the images, and determining distances from the individuals to the families based on the extracted facial features and aggregated facial features for family members of the families in the image gallery of families;
    determining probability distributions for the individuals such that distances from the individuals to the families are associated with probabilities, wherein a family that most resembles an individual has a highest probability for that individual;
    determining a sorted arrangement of highest probability of related families for the individuals; and
    responsive to receiving an image of an unrecognized subject:
        determining distances from the subject to the families based on extracted facial features from the image of the subject and the aggregated facial features;
        determining a probability distribution for the subject such that the distances from the subject to the families are associated with a probability, wherein a family that most resembles the subject has a highest probability for the subject, wherein the highest probability is determined using a softmax function and the distances;
        comparing the highest probability for the subject to the sorted arrangement of highest probabilities of related families to determine a corresponding family associated with the highest probability for the subject, a comparison comprising placing the highest probability for the subject on the sorted arrangement to determine the corresponding family associated with the highest probability for the subject and a corresponding confidence; and
    outputting the corresponding family associated with the highest probability for the unrecognized subject and the corresponding confidence for display.

7. The medium of claim 6, further comprising extracting and aggregating the facial features for the family members of the families in the image gallery of families.

8. The medium of claim 6, wherein the image gallery of families comprises an image of a face of at least one person in each family and at least one face photo for each person.

9. The medium of claim 6, wherein the images of the individuals from the image gallery of families are randomly selected.

10. The medium of claim 6, wherein the images of at least 10, 100, 1000, or 10000 of the individuals from the image gallery of families are selected.

11. The medium of claim 6, wherein the images of the individuals from the image gallery of families are selected as if the individuals are unrecognized.

12. The medium of claim 6, wherein the aggregating comprises averaging.

13. The medium of claim 6, wherein the determined distances comprise vectors.

14. The medium of claim 6, wherein the distances are determined using a cosine distance.

15. The medium of claim 6, wherein the operations further comprise sorting, based on the distances, the families for the individuals, from a family that most resembles an individual to a family that least resembles the individual, or vice versa.

16. The medium of claim 15, wherein the sorting generates an exponential curve for each individual.

17. The medium of claim 16, wherein determining the probability distribution comprises performing the softmax function on the exponential curve for each individual.

18. The medium of claim 6, wherein the sorted arrangement is a sorted ascending arrangement.

19. The medium of claim 18, wherein the sorted ascending arrangement is a vector that represents an expected confidence for each individual.

20. The medium of claim 6, wherein the operations further comprise sorting, based on the distances, the families for the subject, from a family that most resembles the subject to a family that least resembles the subject; and determining the probability distribution for the subject using the softmax function.

* * * * *